United States Patent
Calabrese et al.

(12) 
(10) Patent No.: US 6,519,454 B1
(45) Date of Patent: Feb. 11, 2003

(54) APPARATUS AND METHOD PROVIDING UBIQUITOUS CALL TRANSFER OF AN INCOMING CALL TO A MOBILE SUBSCRIBER UNIT

(75) Inventors: Robert Thomas Calabrese, Naperville, IL (US); Harold Robert Smith, Jr., Oakbrook Terrace, IL (US); Jeffrey Arthur Zahnle, Elburn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/461,834

(22) Filed: Dec. 15, 1999

(51) Int. Cl.[7] .................................................. H04Q 7/20
(52) U.S. Cl. ...................................................... 455/432
(58) Field of Search .................................. 455/432, 414, 455/436; 379/211

(56) References Cited

U.S. PATENT DOCUMENTS 5,867,784 A * 2/1999 Lantto ........................ 455/432

\* cited by examiner

Primary Examiner—William Cumming
(74) Attorney, Agent, or Firm—Steven R. Santema

(57) ABSTRACT

A wireless communications system provides call transfer capability for an incoming call to a mobile subscriber unit. The mobile subscriber unit requests the call transfer to a serving MSC. The serving MSC relays the request to a home location register, and the home location register executes the request by initiating the call transfer in conjunction with an originating MSC. This arrangement obviates the need for supporting call transfer on the serving MSC and the need for inter-MSC facilities once the call transfer is completed. Moreover, the approach of the present invention enables call transfer to be ubiquitously supported within a wireless communications system.

10 Claims, 5 Drawing Sheets

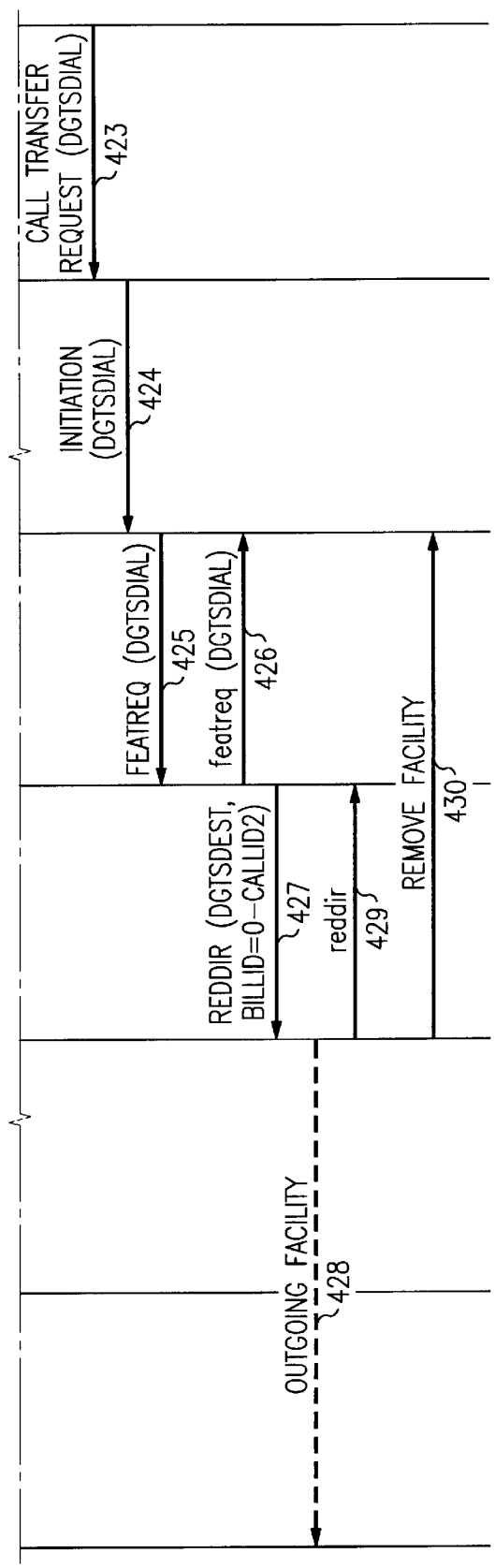
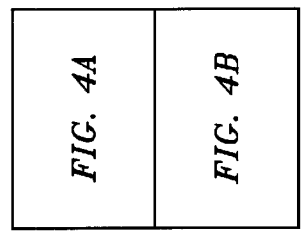
FIG. 4B
FIG. 4
FIG. 4A | FIG. 4B

APPARATUS AND METHOD PROVIDING UBIQUITOUS CALL TRANSFER OF AN INCOMING CALL TO A MOBILE SUBSCRIBER UNIT

FIELD OF THE INVENTION

This invention relates to a wireless communications system providing call transfer for an incoming call to a mobile subscriber unit.

BACKGROUND OF THE INVENTION

Wireless communications systems attempt to provide telephone services to mobile subscribers that are equivalent to traditional landline telephone networks. This objective is complicated by the fact that mobile subscribers may roam away from their home market. Different wireless markets may utilize different manufacturer's equipment. Consequently, mobile subscribers may not be able to use wireless features offered in their home markets if the serving markets do not support the features.

As an example, "call transfer" is a common landline telephone service in which a subscriber can transfer an incoming call to another designated telephone party. However, this service is not always available in a wireless communications system. Not all mobile switching centers (MSC), which provides the switching functionality of a wireless communications system, support call transfer. If an incoming call is delivered to the mobile subscriber's home market that supports call transfer and the mobile subscriber has roamed to another (serving) market, call transfer may not be available to the mobile subscriber. Moreover, even if call transfer is supported by the plurality of MSC's which an incoming call spans, the prior art requires that inter-MSC telephone facilities be configured between the MSC's. Having to support these facilities increases the cost to the wireless service provider, thus increasing the price of service to the wireless subscriber. Thus, there is an important need to provide ubiquitous call transfer to the wireless subscriber.

FIG. 1 illustrates an architecture supported by a wireless communications system that supports an incoming call to a mobile subscriber unit associated with a wireless subscriber in accordance with prior art. In FIG. 1, an incoming call originates from public switching telephone network (PSTN) 100 for mobile subscriber unit 105. The incoming call is delivered to originating mobile switching center ("originating" MSC) 101 (in which mobile subscriber unit 105 may or may not be located) through telephone facility 106. Typically, mobile subscriber unit 105 is provisioned (homed) at originating MSC 101, and PSTN 100 delivers all incoming calls to originating MSC 101.

If mobile subscriber unit 105 is not located within a region served by originating MSC 101, the incoming call must be delivered to serving mobile switching center (serving MSC) 103 in which mobile subscriber unit 105 is located. Originating MSC 101 determines where mobile subscriber unit is located by querying home location register (HLR) 102 using data facility 107. Whenever mobile subscriber unit 105 changes locations so that it is located in a region of a different serving MSC, HLR 102 is updated with the updated location through data facility 109. HLR 102 may be physically separate entity or may be physically located at originated MSC 101. The incoming call is delivered to serving MSC 103 through inter-mobile switching center (inter-MSC) facility 108. Serving MSC 103 connects the incoming call through base station 104 (where mobile subscriber unit is currently located) over trunk 110. Base station 104 establishes radio connection 111 to mobile subscriber unit 105, thus completing the incoming call between PSTN 100 and mobile subscriber unit 105. The telephone path of the incoming call consists of telephone facility 106, inter-MSC facility 108, trunk 110, and radio connection 111. Since the telephone path is completed at serving MSC 103, if serving MSC 103 is situated in a billing zone that is associated with long-distance rates, the party initiating the incoming call may be charged at a long-distance rate even though the designated party to which the call was transferred is not in a billing zone that is charged at a long distance rate.

FIG. 2 presents a message flow for transferring an incoming call (from PSTN 100) by mobile subscriber 105 to a designated party served by PSTN 100 in accordance with prior art. PSTN 100 uses telephone facility 206 to deliver the incoming call to originating MSC 101. Originating MSC 101 queries HLR 102 by sending LOCREQ message 207 in order to determine the current location of mobile subscriber 105 to route the call to the appropriate serving MSC 103. (Message 207 is specified in American National Standards Institute ANSI-41.) Message 207 includes a BILLID parameter equal to O-CALLID to identify the call identification as assigned by originating MSC 101. Consequently, HLR 102 sends ROUTREQ message 208 (specified in ANSI-41) to serving MSC 103 to determine the preferred method of routing the incoming call to serving MSC 103. Message 208 contains the BILLID parameter equal to O-CALLID. Serving MSC 103 returns this information using routreq message 209 (specified in ANSI-41). Message 209 contains the BILLID parameter equal to S-CALLID, which is the call identification assigned by serving MSC 103. Consequently, HLR 102 is able to relate the call identification assigned by originating MSC 101 (O-CALLID) with the call identification assigned by serving MSC 103 (S-CALLID) of the incoming call. Serving MSC 103 establishes a trunk to base station 104, in which the mobile is located, in preparation for supporting the incoming call. Base station 104 consequently establishes radio connection 212 to mobile subscriber unit 105.

HLR 102 returns the location of mobile subscriber unit 105 to originating MSC 101 by sending locreq message 211 (specified in ANSI-41). Message 211 contains the BILLID parameter equal to S-CALLID. Originating MSC 101 then establishes a connection to serving MSC 103 through inter-MSC facility 213. Inter-MSC facility 213 corresponds to inter-MSC facility 108 in FIG. 1. At this point of time, the incoming call to mobile subscriber unit 105 has been completed.

If mobile subscriber unit 105 wishes to transfer the incoming call to a designated party (and consequently causing mobile subscriber unit 105 to be disconnected from the call), mobile subscriber unit sends call transfer request message 214 to base station 104. Message 214 is dependent upon the air interface technology, e.g. Advanced Mobile Phone Service (AMPS), Time Division Multiple Access (TDMA), Code Division Multiple Access (CDMA), and Groupe Special Mobile (GSM), being supported by base station 104. (The specific messages for each air interface technology are known to one skilled in the art.) Base station 104 relays this request to serving MSC 103 utilizing facility request message 215. Messages 214 and 215 contain dialed digits generated by mobile subscriber unit 105. The dialed digits are interpreted by serving MSC 103 to signify a request for call transfer to a designated party. Serving MSC 103 establishes outgoing facility 216 and connects the incoming call to the designated party. At this point of time, the telephone path consists of telephone facility 206, inter-MSC facility 213, and outgoing facility 216.

Serving MSC 103 initiates the removal of radio connection 212 by sending disconnect message 217, which in turn causes base station 104 to send disconnect message 218 to mobile subscriber unit 105. Disconnect message 218 is dependent upon the air interface technology.

In the prior art, the mobile subscriber unit can be afforded call transfer service only if the serving MSC supports call transfer. In other words, even if the originating MSC supports call transfer, the mobile subscriber unit cannot initiate call transfer if the serving MSC does not support it. The present invention does not require the serving MSC to support call transfer in order for the mobile subscriber unit to obtain a call transfer of an incoming call. Moreover, the number of required telephone facilities is reduced.

SUMMARY OF THE INVENTION

The apparatus and method of the present invention enables a wireless communications system to transfer an incoming call by utilizing call processing at a serving mobile switching center, an originating mobile switching center, and a home location register.

The serving mobile switching center (where the mobile subscriber unit is located) executes program instructions to generate a query to the home location register in response to a request for a call transfer from the mobile subscriber unit. The home location register executes program instructions that interpret the query from the serving mobile switching center and instructs the originating switching center, to which the incoming call was delivered from the public switching center, to redirect the incoming call to a designated party. The originating mobile switching center executes program instructions to redirect the incoming call and to remove telephone facilities to the serving mobile switching center.

Numerous other advantages and features of the present invention will become readily apparent from the detailed description of the invention and the embodiments thereof, from the claims, and from the accompanying drawings.

DETAILED DESCRIPTION

Figure 1:
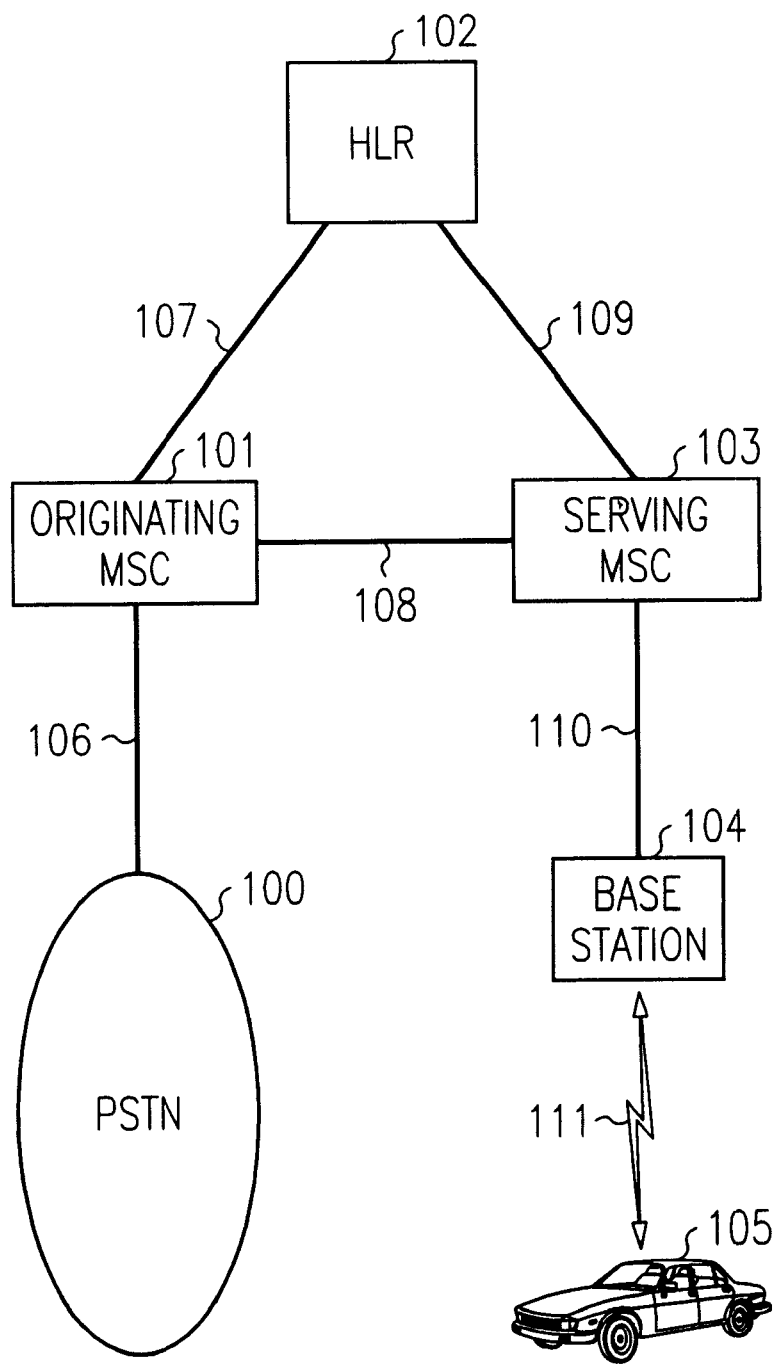
FIG. 1 illustrates an architecture of a wireless communications system supporting an incoming call in accordance with prior art.
Figure 2:
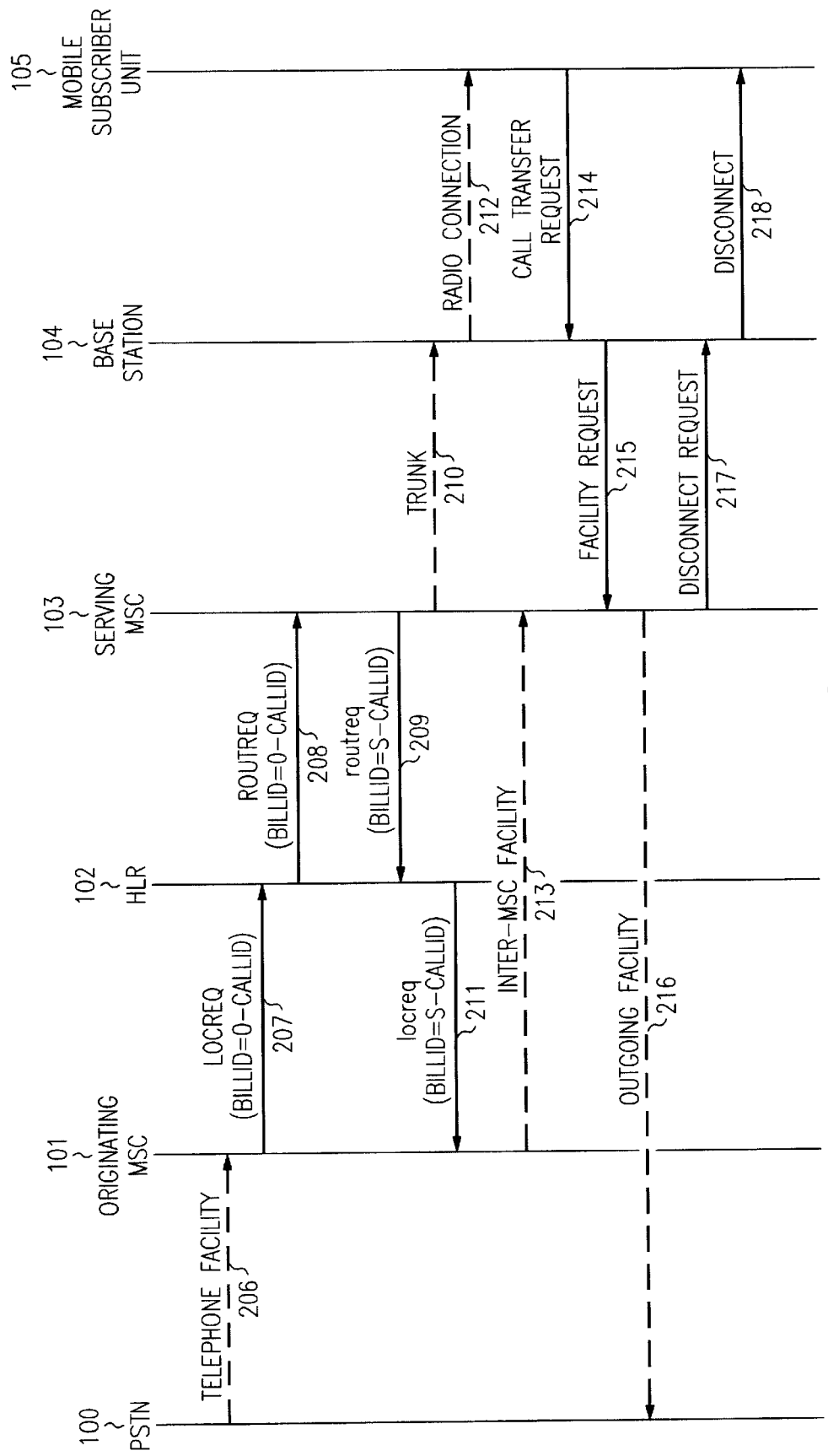
FIG. 2 presents a message flow for transferring an incoming call from a mobile subscriber unit to a designated party in accordance with prior art.
Figure 3:
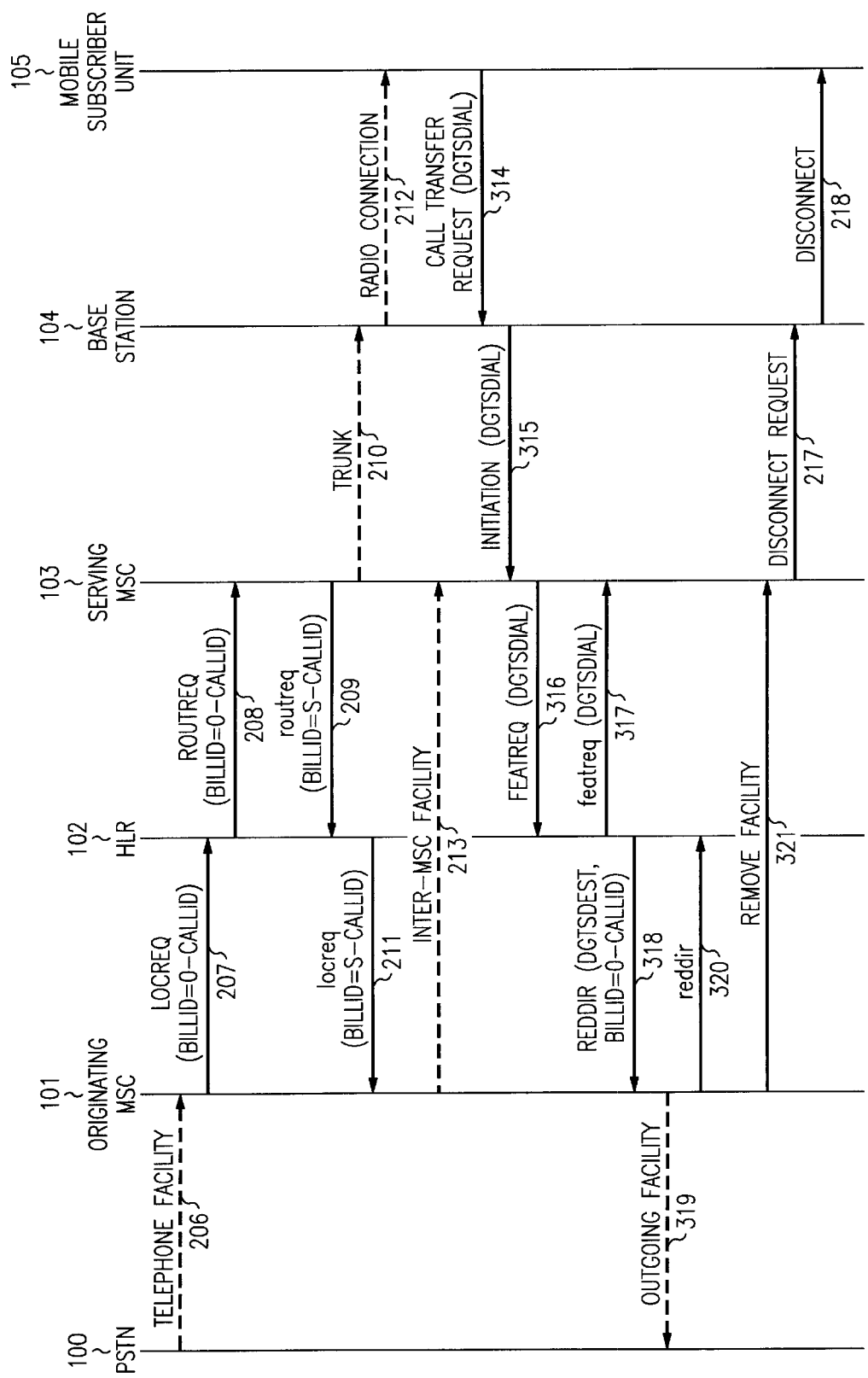
FIG. 3 illustrates a message flow for transferring an incoming call from a mobile subscriber unit to a designated party in accordance with the present invention.

FIG. 3 illustrates a message flow for transferring an incoming call from a mobile subscriber unit to a designated party in accordance with the present invention. The message flow in FIG. 3 is analogous as the message flow in FIG. 2 up to the instance in which mobile subscriber unit 105 requests a call transfer.

As shown in FIG. 3, the incoming call originates from PSTN 100. However, the incoming call may originate from a second mobile subscriber unit. If the second mobile subscriber unit is served by the same wireless communications system as mobile subscriber unit 105, the incoming call may be delivered to originating MSC 101 without being routed through PSTN 100.

An exemplary embodiment shown in FIG. 3 does not require that call transfer functionality be supported at serving MSC 103 itself in order for mobile subscriber 105 to be able to utilize a call transfer. In FIG. 3, mobile subscriber unit 105 sends call transfer request message 314 to base station 104, requesting a call transfer. Message 104 identifies the designated party to which the incoming call shall be transferred as contained in a DGTSDIAL field. The actual format is dependent upon the air interface technology and is known to one skilled in the art. Base station 104 passes the feature request from mobile subscriber 105 to serving MSC 103 without attempting to execute the feature request by sending initiation message 315. Also, whenever possible, standardized messages specified in ANSI-41 are utilized to provide compatibility between MSC's manufactured by different vendors. Message 315 contains the dialed digits, as specified in a DGTSDIAL parameter, from mobile subscriber unit 105. Serving MSC 103 does not process the request; rather serving MSC 103 sends the dialed digits in FEATREQ message 316 (specified in ANSI-41) to HLR 102. HLR 102 processes the dialed digits and determines that the incoming call shall be transferred to a designated party as specified by the DGTSDIAL parameter. Serving MSC 103 is notified of subsequent call processing in the FEATRESULT parameter of featreq message 317 (specified in ANSI-41).

HLR 102 requests that originating MSC 101 transfer the incoming call to the designated party by sending REDDIR message 318 (specified in ANSI-41) to originating MSC 101. HLR 102 identifies the call identification of the incoming call by setting the value of the BILLID parameter to O-CALLID. (As previously discussed in FIG. 2, HLR 102 is able to relate the call identification assigned by originating MSC 101 with the call identification assigned by serving MSC 103 for the corresponding incoming call.) Message 318 also contains the DGTSDEST parameter, which specifies the designated party. HLR 102 determines the DGTSDEST parameter from a DGTSDIAL parameter contained in message 316. Originating MSC establishes outgoing facility 319 to complete a telephone path between the incoming call and the designated party. The telephone path consists of telephone facility 206 and outgoing facility 319. Originating MSC 101 notifies HLR 102 by sending reddir message 320 (specified in ANSI-41). Also, originating MSC 101 removes inter-MSC facility 213 from the call configuration by sending remove facility message 321 to serving MSC 103. Serving MSC 103 initiates the removal of radio connection 212 by sending disconnect request message 217 to base station 104. Consequently, base station removes radio connection 212 by sending disconnect message 218.

Figure 4A:
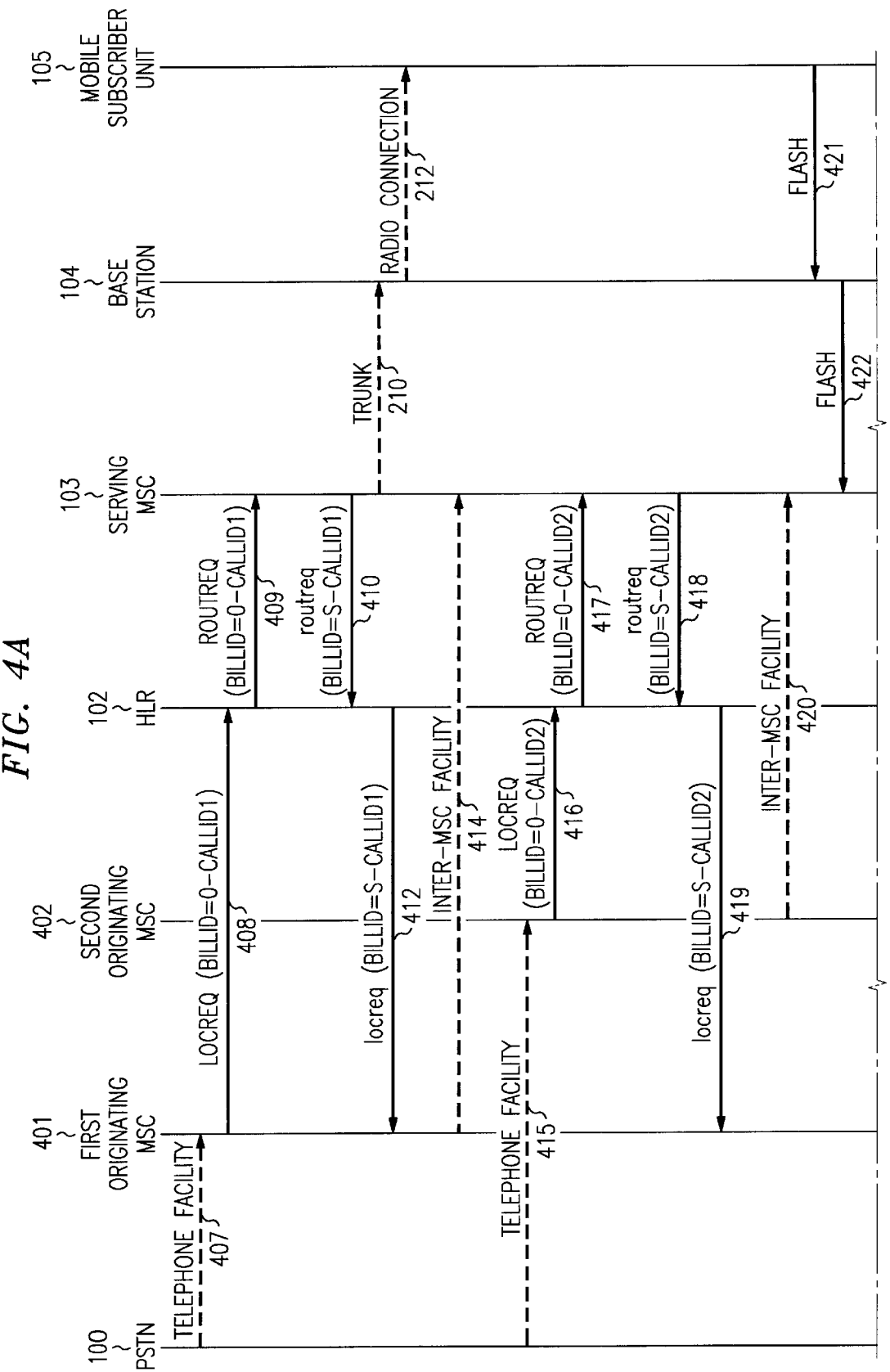
FIG. 4 illustrates a message flow utilizing call waiting in which a designated incoming call, selected from one of two incoming calls, is transferred to a designated party in accordance with the present invention.

In another exemplary embodiment, FIG. 4 illustrates a message flow with call waiting in which a designated incoming call, selected from one of two incoming calls, is transferred to a designated party in accordance with the present invention. The message flow in FIG. 4 is analogous to the message flow in FIG. 3 up to the instance in which inter-MSC facility 414 is established. Thus, first originating MSC 401 corresponds to originating MSC 101; telephone facility 407 corresponds to telephone facility 206; LOCREQ message 408 corresponds to LOCREQ message 207; ROUTREQ message 409 corresponds to ROUTREQ message 208; routreq message 410 corresponds to routreq 209;

locreq message 412 corresponds to locreq message 211; and inter-MSC facility 414 corresponds to inter-MSC facility 213.

Additionally, in FIG. 4 a second incoming call is delivered to second originating MSC 402 over telephone facility 415. (The exemplary embodiment shown in FIG. 4 does allow first originating MSC 401 and second originating MSC 402 to be the same originating MSC.) Second originating MSC 402 delivers the second incoming call to serving MSC 103 in an analogous way as first originating MSC 401 delivered the first incoming call to serving MSC 103. Thus, LOCREQ message 416 corresponds to LOCREQ message 408; ROUTREQ message 417 corresponds to ROUTREQ message 409; routreq message 418 corresponds to routreq message 410; locreq message 419 corresponds to locreq message 412; and inter-MSC facility 420 corresponds to inter-MSC facility 414. In messages 408, 409, 410, and 412, the BILLID parameter contains the call identification associated with the first incoming call (corresponding to O-CALLID1, O-CALLID1, S-CALLID1, and S-CALLID1, respectively). However, the value of the BILLID parameter in messages 416, 417, 418, and 419 is set to the call identification of the second incoming call (corresponding to O-CALLID2, O-CALLID2, S-CALLID2, and S-CALLID2, respectively).

At this point of time, the second incoming call is delivered to serving MSC 103. However, radio connection 212 supports one incoming call at a particular instance of time. Thus, mobile subscriber unit 105 may talk and listen only to one incoming call (either the first incoming call or the second incoming call). Mobile subscriber unit 105 and toggle from one incoming call to another by sending flash message 421. The capability of toggling from one incoming call to another is supported by call waiting. Call waiting is a commonly supported feature of telephony systems, including wireless communications systems. Base station 104 relays this toggle request by sending flash request message to serving MSC 103. At this point in the message flow, mobile subscriber unit 105 is talking and listening to the second incoming call, i.e. the second incoming call is active.

Mobile subscriber unit 105 initiates call transfer by sending call transfer request message 423 (analogous to message 314 in FIG. 3). The dialed digits as entered at mobile subscriber unit 105 may explicitly specify the incoming call to be transferred (either the first or second incoming call). Alternatively, if the identification of the incoming call is not specified in the dialed digits, the incoming call is understood to be the active incoming call. In FIG. 4, the active incoming call is the second incoming call. Base station 104 relays the transfer request by sending initiation message 424 to serving MSC 103 (analogous to message 315 in FIG. 315). Serving MSC 103 relays this request to HLR 102 by sending FEATREQ 425 (analogous to message 316 in FIG. 3).

HLR 102 processes the dialed digits contained in the DGTSDIAL parameter of message 425 and instructs serving MSC 103 about subsequent call processing of the feature request by returning featreq message 426 to serving MSC 103 (analogous to message 317 in FIG. 3). HLR 102 determines that the second incoming call shall be transferred to the designated party; thus, HLR 102 sends REDDIR message 427 to second originating MSC 402. Message 427 contains the BILLID parameter equal to O-CALLID2, which is the call identification of the second incoming call. Consequently, originating MSC 402 performs a call transfer of ,the second incoming call. Second originating MSC 402 establishes outgoing facility 428 to complete the call transfer between the second incoming call and the designated party.

At this point of time, the telephone path at second originating MSC 402 consists of telephone facility 415 and outgoing facility 428. Second originating MSC 402 notifies HLR 102 about the completion of the call transfer by sending reddir message 429 to HLR 102. Inter-MSC facility 420 is removed by second originating MSC 402 sending remove facility message 430 to serving MSC 103.

At this point of time, the message flow in FIG. 4 differs from the message flow of FIG. 3 in that the radio connection is not removed in FIG. 4. The reason is that mobile subscriber unit is still connected to the first incoming call. However, this exemplary embodiment allows mobile subscriber unit 105 to initiate a subsequent call transfer request. Subsequent call processing would follow the message flow as illustrated in FIG. 3 in such a case.

It is to be understood that the above-described embodiment is merely an illustrative principle of the invention and that many variations may be devised by those skilled in the art without departing from the scope of the invention. It is, therefore, intended that such variations be included with the scope of the claims.

What is claimed:

1. A wireless communications system serving an incoming call to a mobile subscriber unit that is located within a region served by a serving mobile switching center, said incoming call connected to said mobile subscriber unit through an originating mobile switching center, said originating mobile switching center and said serving mobile switching center connected by an inter-mobile switching center telephone facility, said wireless communications system comprising:

means for said serving mobile switching center receiving a request for a call transfer of said incoming call to a designated party from said mobile subscriber unit;

means, responsive to said means of receiving a request from said mobile subscriber unit, for said serving mobile switching center sending a query to a home location register to determine subsequent action;

means, responsive to said means for said serving mobile switching center sending said query, for said home location register sending an instruction to said originating mobile switching center to redirect said incoming call to said designated party;

means, responsive to said means for said home location register sending said instruction, for said originating mobile switching center causing a public switching telephone network to establish a telephone facility to said designated party;

means, responsive to said causing means, for said originating mobile switching center connecting said incoming call to said designated party over said telephone facility;

means, responsive to said connecting means, for said originating mobile switching center and said serving mobile switching center removing said intermobile switching center telephone facility; and means, responsive to said removing means, for said serving mobile switching center to disconnect said incoming call to said mobile subscriber unit.

2. The wireless communications system of claim 1, wherein said incoming call originates from said public switching telephone network.

3. The wireless communications system of claim 1, wherein said incoming call originates from a second mobile subscriber unit.

4. The wireless communications system of claim 1, wherein said query is encoded by an ANSI-41 compatible FEATREC message.

5. The wireless communications system of claim 1, wherein said instruction is encoded by an ANSI-41 compatible REDDIR message.

6. A wireless communications system serving two incoming calls to a mobile subscriber unit that is located within a region served by a serving mobile switching center, one of said two incoming calls selected by said mobile subscriber unit as a designated incoming call, said designated incoming call connected through an assigned originating mobile switching center and over an assigned inter-mobile switching center facility between said assigned originating mobile switching center and said serving mobile switching center, said wireless communications system comprising:

means for said serving mobile switching center receiving a request to transfer said designated incoming call to a designated party from said mobile subscriber unit;

means, for said serving mobile switching center sending a query to a home location register to determine subsequent action, responsive to said means of receiving said request;

means, responsive to said means for said serving mobile switching center sending said query, for said home location register sending an instruction to said assigned originating mobile switching center to redirect said designated incoming call to said designated party;

means, responsive to said means for said home location register sending said instruction, for said assigned originating mobile switching center causing a public switching telephone network to establish a telephone facility to said designated party;

means, responsive to said causing means, for said assigned originating mobile switching center connecting said designated incoming call to said designated party over said telephone facility; and means, responsive to connecting means, for said assigned originating mobile switching center and said serving mobile switching center removing said assigned inter-mobile switching center telephone facility.

7. The wireless communications system of claim 6, wherein said query is encoded by an ANSI-41 compatible FEATREC message.

8. The wireless communications system of claim 6, wherein said instruction is encoded by an ANSI-41 compatible REDDIR message.

9. A method for transferring an incoming call in a wireless communications system serving said incoming call to a mobile subscriber unit that is located within a region served by a serving mobile switching center, said incoming call connected to said mobile subscriber unit through an originating mobile switching center, said originating mobile switching center and said serving mobile switching center connected by an inter-mobile switching center telephone facility, said method comprising the steps of:

receiving a request for a call transfer of said incoming call to a designated party from said mobile subscriber unit at said serving mobile switching center;

querying a home location register to determine subsequent action by said serving mobile switching center, responsive to said step of receiving said request;

sending an instruction to said originating mobile switching center to redirect said incoming call to said designated party by said home location register, responsive to said step of querying;

causing a public switching telephone network to establish a telephone facility to said designated party by said originating mobile switching center, responsive to said step of sending said instruction by said home location register;

connecting said incoming call to said designated party by said originating mobile switching center, responsive to said step of causing said public switching telephone network to establish said telephone facility; and removing said inter-mobile switching center telephone facility between said originating mobile switching center and said serving mobile switching center, responsive to said step of connecting said incoming call; and disconnecting said incoming call to said mobile subscriber unit by said serving mobile switching center, responsive to said step of removing said inter-mobile switching center telephone facility.

10. A method for transferring a designated incoming call in a wireless communications system serving two incoming calls to a mobile subscriber unit that is located within a region served by a serving mobile switching center, one of said two incoming calls selected by said mobile subscriber unit as said designated incoming call, said designated incoming call connected through an assigned originating mobile switching center and over an assigned inter-mobile switching center facility between said serving mobile switching center and said assigned originating mobile switching center, said method comprising the steps of:

receiving a request for a call transfer of said designated incoming call to a designated party from said mobile subscriber unit at said serving mobile switching center;

querying a home location register to determine subsequent action by said serving mobile switching center, responsive to said step of receiving said request;

sending an instruction to said assigned originating mobile switching center to redirect said designated incoming call to said designated party by said home location register, responsive to said step of querying;

causing a public switching telephone network to establish a telephone facility to said designated party by said originating mobile switching center, responsive to said step of sending said instruction by said home location register;

connecting said designated incoming call to said designated party by said assigned originating mobile switching center, responsive to said step of causing; and removing said assigned inter-mobile switching center telephone facility by said assigned originating mobile switching center and said serving mobile switching center, responsive to said step of connecting said designated incoming call to said designated party.

* * * * *